United States Patent

Matsumoto et al.

(10) Patent No.: US 9,885,319 B2
(45) Date of Patent: Feb. 6, 2018

(54) VEHICULAR FUEL COOLING DEVICE

(71) Applicant: TOYOTA JIDOSHA KABUSHIKI KAISHA, Toyota-shi, Aichi-ken (JP)

(72) Inventors: Hiroaki Matsumoto, Nagoya (JP); Kunihiko Jinno, Toyota (JP); Hidekazu Hirabayashi, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/027,604

(22) PCT Filed: Dec. 16, 2014

(86) PCT No.: PCT/JP2014/083237
§ 371 (c)(1),
(2) Date: Apr. 6, 2016

(87) PCT Pub. No.: WO2015/111330
PCT Pub. Date: Jul. 30, 2015

(65) Prior Publication Data
US 2016/0319773 A1    Nov. 3, 2016

(30) Foreign Application Priority Data

Jan. 22, 2014  (JP) ................. 2014-009828

(51) Int. Cl.
| F02M 31/20 | (2006.01) |
| F02M 37/00 | (2006.01) |
| F02M 21/02 | (2006.01) |
| B60H 1/00 | (2006.01) |
| F02D 41/30 | (2006.01) |
| B60H 1/32 | (2006.01) |
| F02D 41/02 | (2006.01) |

(52) U.S. Cl.
CPC ...... *F02M 21/0227* (2013.01); *B60H 1/00271* (2013.01); *F02D 41/3082* (2013.01); *F02M 21/023* (2013.01); *F02M 21/0212* (2013.01); *F02M 31/20* (2013.01); *F02M 37/0052* (2013.01); *B60H 1/323* (2013.01); *F02D 41/021* (2013.01); *F02D 2200/0606* (2013.01); *Y02T 10/126* (2013.01); *Y02T 10/32* (2013.01)

(58) Field of Classification Search
CPC .......... F02M 21/0227; F02M 21/0212; F02M 21/023; F02M 31/20; F02M 37/0052; F02D 41/3082
USPC ........................................ 123/445, 514, 461
See application file for complete search history.

(56) References Cited

U.S. PATENT DOCUMENTS

2014/0109971 A1* 4/2014 Kim ................ F16L 53/00
137/1

FOREIGN PATENT DOCUMENTS

JP        2008-267190 A    11/2008

* cited by examiner

*Primary Examiner* — Mahmoud Gimie
(74) *Attorney, Agent, or Firm* — Oliff PLC

(57) ABSTRACT

A vehicle fuel cooling device includes a return passage and a fuel cooling unit arranged on the return passage. A non-injected surplus fuel of a fuel supplied to a fuel injection valve is returned to a fuel tank through the return passage as a return fuel. When a part of the cooling medium of a vehicle air conditioning system is circulated to the fuel cooling unit, the cooling medium flowing through the fuel cooling unit cools the return fuel through heat exchange. In the vehicle fuel cooling device, when a part of the cooling medium is circulated to the fuel cooling unit to cool the return fuel, an amount of return fuel to be returned to the fuel tank is increased compared to when the return fuel is not cooled.

8 Claims, 6 Drawing Sheets

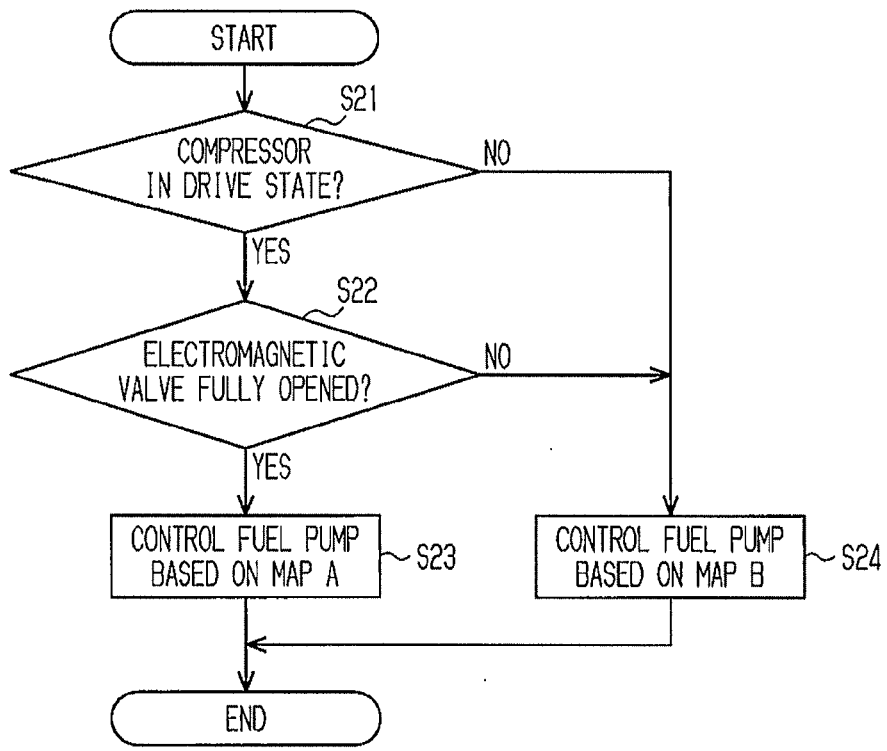
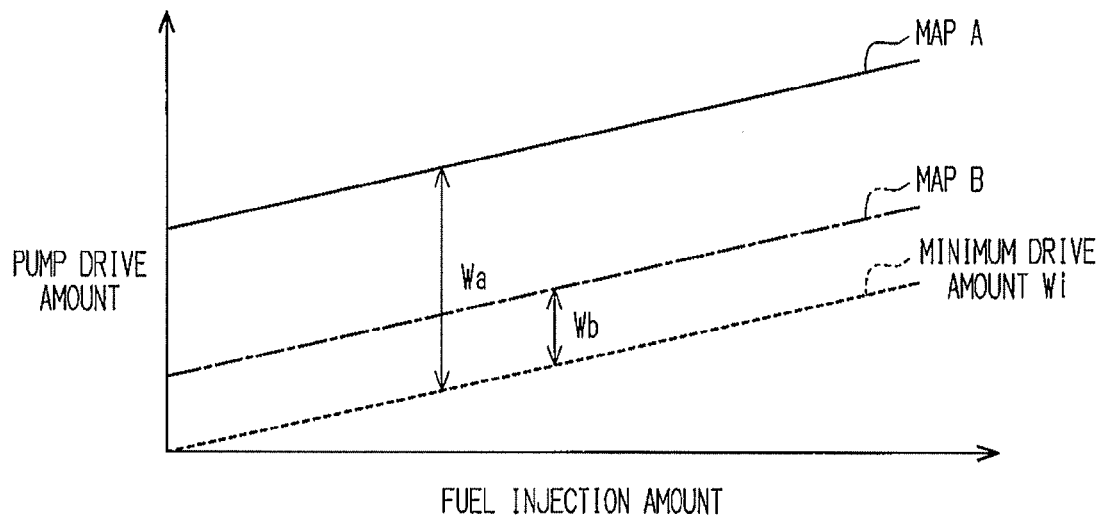

Fig.4(a) TEMPERATURE IN FUEL TANK
Fig.4(b) ELECTROMAGNETIC VALVE, FULLY OPENED, FULLY CLOSED
Fig.4(c) AMOUNT OF RETURN FUEL
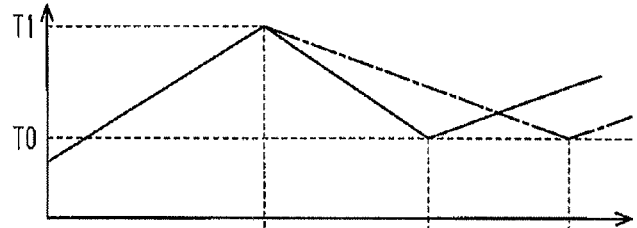
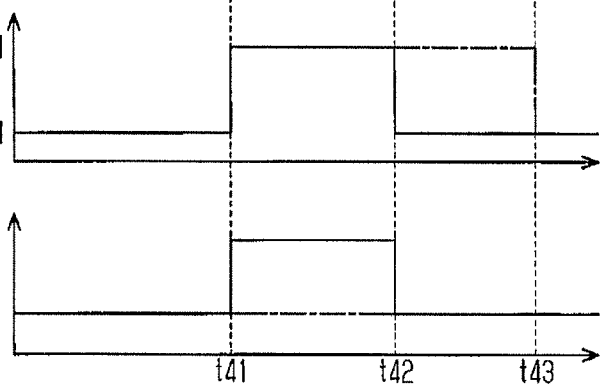
Fig.5
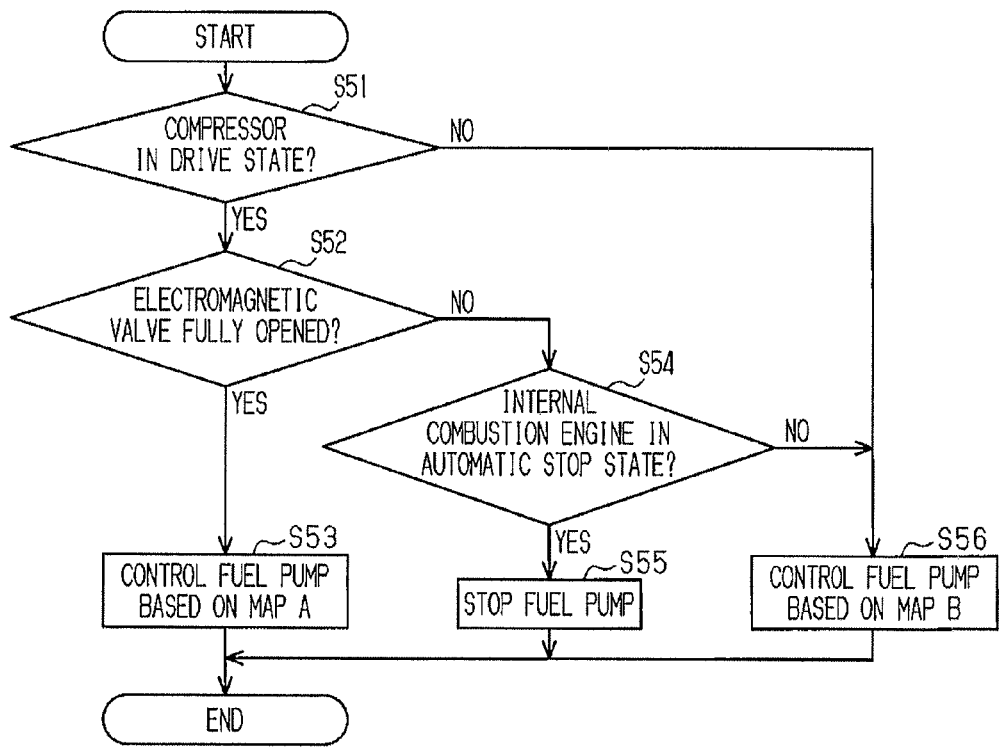

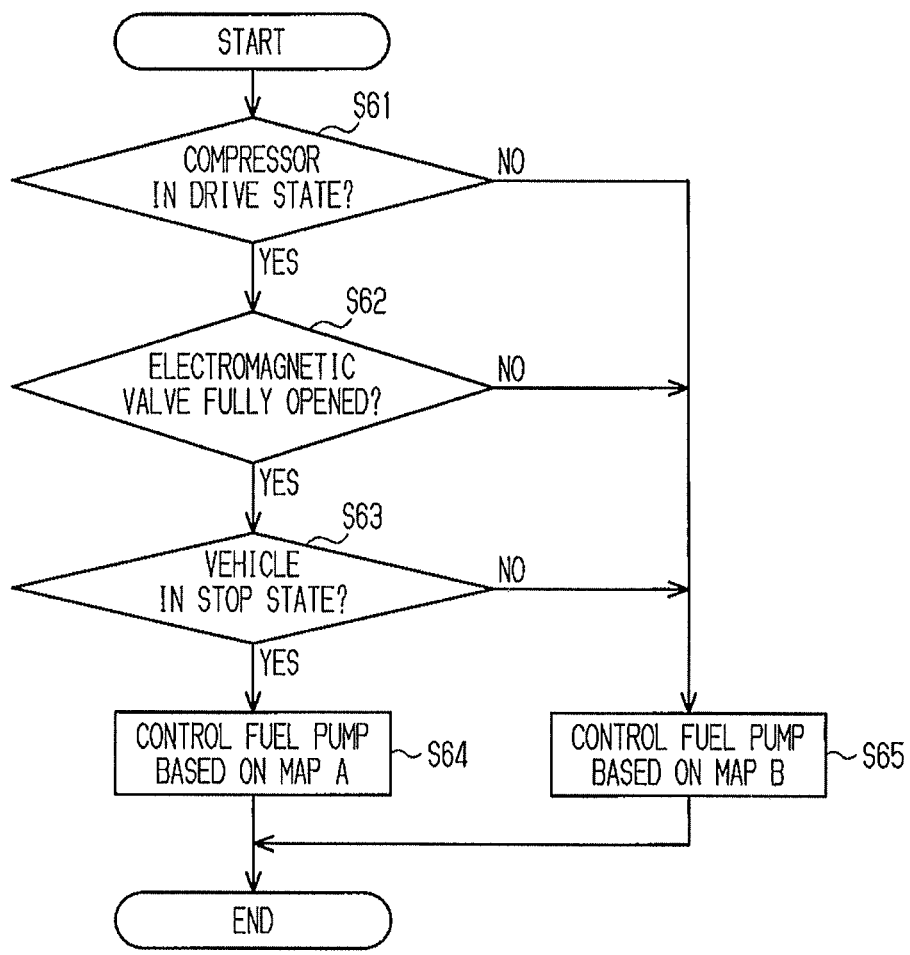

TEMPERATURE IN FUEL TANK

ELECTROMAGNETIC VALVE, FULLY OPENED, FULLY CLOSED

AMOUNT OF RETURN FUEL

SHIFT RANGE

VEHICULAR FUEL COOLING DEVICE

TECHNICAL FIELD

The present invention relates to a vehicular fuel cooling device that cools fuel using a cooling medium of an air conditioning system mounted on a vehicle.

BACKGROUND ART

A vehicle that uses liquefied gas fuel such as liquefied petroleum gas (LPG) is conventionally known. In this type of vehicle, the liquefied gas fuel is injected from a fuel injection valve to a combustion chamber, and the non-injected surplus fuel is returned to a fuel tank as a return fuel.

Patent document 1 discloses a vehicle including an air conditioning system that cools the air blown into a vehicle compartment, and a fuel cooling device that cools the return fuel using a part of a cooling medium of the air conditioning system. In the air conditioning system, the air introduced into the vehicle compartment is cooled using a refrigerating cycle. In other words, the air passing through an evaporator is cooled using a vaporization heat of when the cooling medium compressed by a compressor is vaporized by the evaporator. The cooled air is introduced into the vehicle compartment.

The fuel cooling device includes a branched passage branched from a circulating path of the cooling medium of the air conditioning system, and a throttle valve arranged on the branched passage. The throttle valve adjusts the amount of cooling medium flowing through the branched passage. A fuel cooling unit is arranged on the branched passage. The cooling medium supplied to the fuel cooling unit cools the return fuel through heat exchange.

In the device described in patent document 1, the compressor is driven and the cooling medium is supplied to the fuel cooling device when a pressure in the fuel tank becomes greater than or equal to a predetermined pressure while the compressor is stopped. The return fuel is thereby cooled and then returned to the fuel tank, whereby the temperature in the fuel tank lowers. The pressure in the fuel tank thus lowers, and the refilling of fuel to the fuel tank can be realized.

Furthermore, in this type of vehicle, the amount of fuel supplied to the fuel injection valve cannot become deficient with respect to the amount of fuel injected from the fuel injection valve. Thus, the fuel in which a predetermined amount is added in extra to the injection amount is supplied to the fuel injection valve. As a result, the fuel of an amount substantially equal to the predetermined extra amount is returned to the fuel tank as the return fuel. In this case, the amount of return fuel is set based on the fuel injection amount. Thus, in the device described in patent document 1, the fuel of an amount substantially equal to the predetermined extra amount is constantly returned to the fuel tank as the return tank. If the predetermined extra amount is small, therefore, the fuel tank is less likely to be cooled even if the return fuel is cooled since the amount of low temperature fuel returned to the fuel tank is small. Thus, a considerable time is required until the refilling of fuel to the fuel tank is enabled. If the predetermined extra amount is large, on the other hand, the return fuel is returned to the fuel tank even though the return fuel is not sufficiently cooled. In this case, the return fuel receives the heat of the internal combustion engine and becomes a high temperature. Thus, if a large amount of high temperature return fuel is returned to the fuel tank, the temperature in the fuel tank may rise.

PRIOR ART DOCUMENT

Patent Document

Patent document 1: Japanese Laid-Open Patent Publication No. 2008-267190

SUMMARY OF THE INVENTION

Problems that the Invention is to Solve

It is an object of the present invention to provide a vehicle fuel cooling device that can suppress a temperature rise in the fuel tank and that can rapidly lower the temperature in the fuel tank.

Means for Solving the Problems

To achieve the object described above, according to a first aspect of the present invention, there is provided a vehicle fuel cooling device including a return passage that returns a non-injected surplus fuel of a fuel supplied to a fuel injection valve to a fuel tank as a return fuel and a fuel cooling unit arranged on the return passage. The vehicle fuel cooling device cools the return fuel through heat exchange with a cooling medium flowing through the fuel cooling unit by circulating a part of the cooling medium of a vehicle air conditioning system to the fuel cooling unit. In the vehicle fuel cooling device, when circulating the part of the cooling medium to the fuel cooling unit to cool the return fuel, an amount of return fuel to be returned to the fuel tank is increased compared to when the return fuel is not cooled.

According to the configuration described above, the amount of return fuel to be returned to the fuel tank is increased when the return fuel is cooled. In this case, the low temperature return fuel is returned to the fuel tank in large amounts, and thus the temperature in the fuel tank can be rapidly lowered. On the other hand, the amount of return fuel to be returned to the fuel tank is reduced when the return fuel is not cooled. In this case, the amount of high temperature return fuel, which is not cooled, to be returned to the fuel tank is suppressed small, and thus the temperature rise in the fuel tank can be suppressed. Therefore, the temperature rise in the fuel tank can be suppressed and the temperature in the fuel tank can be rapidly lowered.

In the vehicle fuel cooling device described above, preferably, the vehicle air conditioning system includes a circulating path that circulates the cooling medium and a branched passage branched from the circulating path; the cooling medium is supplied to the fuel cooling unit through the branched passage; an electromagnetic valve is arranged on the branched passage; when the electromagnetic valve is in a fully closed state, the supply of the cooling medium from the circulating path to the fuel cooling unit is shielded and the cooling of the return fuel is stopped; and when the electromagnetic valve is in a valve open state, the cooling medium is supplied from the circulating path to the fuel cooling unit to cool the return fuel, and the amount of return fuel to be returned to the fuel tank is increased in comparison to when the electromagnetic valve is in the fully closed state.

When controlling the cooling mode of the return fuel by the open/close control of the electromagnetic valve, the amount of return fuel is increased when the electromagnetic valve is in the valve open state compared to when the electromagnetic valve is in the valve close state. Thus, the amount of return fuel to be returned to the fuel tank can be increased when the return fuel is cooled, compared to when the return fuel is not cooled.

In the vehicle fuel cooling device described above, the electromagnetic valve is preferably controlled to be in the fully opened state or the fully closed state; and the amount of return fuel to be returned to the fuel tank is preferably increased when the electromagnetic valve is in the fully opened state compared to when the electromagnetic valve is in the fully closed state.

In the configuration described above, the cooling of the return fuel is executed by fully opening the electromagnetic valve, and the cooling of the return fuel is stopped by fully closing the electromagnetic valve. In this case, the amount of return fuel is increased when the electromagnetic valve is in the fully opened state compared to when the electromagnetic valve is in the fully closed state. Furthermore, when the electromagnetic valve is in the valve open state, the opening of the electromagnetic valve may be gradually reduced or gradually increased.

In the vehicle fuel cooling device described above, the amount of return fuel to be returned to the fuel tank is preferably increased when an opening of the electromagnetic valve increases.

In the configuration described above, the cooling efficiency of the return fuel increases as the amount of cooling medium flowing through the branched passage becomes larger when the opening of the electromagnetic valve increases. In this case, the amount of low temperature return fuel to be returned to the fuel tank is increased by further increasing the amount of return fuel. Thus, the temperature in the fuel tank can be more rapidly lowered. Moreover, in this case, the amount of return fuel can be controlled based on the drive amount of the fuel pump that supplies the fuel to the fuel injection valve. In other words, the amount of return fuel can be increased by increasing the drive amount of the fuel pump.

Thus, in the vehicle fuel cooling device described above, a fuel pump that supplies the fuel in the fuel tank to the fuel injection valve is preferably further arranged; wherein the amount of return fuel to be returned to the fuel tank is preferably increased by increasing a drive amount of the fuel pump.

In the vehicle fuel cooling device described above, the vehicle fuel cooling device is preferably mounted on a vehicle that automatically stops an internal combustion engine; and when the internal combustion engine is in an automatic stop state and the return fuel is not cooled, the fuel pump is preferably stopped.

When the internal combustion engine is in the automatic stop state, the fuel does not need to be injected from the fuel injection valve, and thus substantially the whole amount of fuel pumped up from the fuel pump is returned to the fuel tank as the return fuel. Thus, the high temperature return fuel is returned to the fuel tank in large amounts when the return fuel is not cooled, whereby the temperature in the fuel tank easily rises. In this regard, in the configuration described above, the drive of the fuel pump is stopped when the internal combustion engine is in the automatic stop state and when the return fuel is not cooled. Therefore, the amount of high temperature fuel to be returned to the fuel tank becomes small as possible, and the temperature rise in the fuel tank can be suppressed. Furthermore, since the unnecessary drive of the fuel pump is also suppressed, the fuel efficiency can be improved and the temperature rise in the fuel tank can be further suppressed.

In the vehicle fuel cooling device described above, preferably, when the vehicle is stopped, an amount increasing control of increasing the amount of return fuel to be returned to the fuel tank when the return fuel is cooled compared to when the return fuel is not cooled is executed; and when the vehicle is not stopped, the amount increasing control is prohibited.

The fuel may not be refilled if the temperature in the fuel tank is high. Thus, when the vehicle is stopped and there is a possibility of the fuel being refilled, the temperature in the fuel tank is desirably rapidly lowered. On the other hand, when the vehicle is travelling and the fuel is not refilled, the fuel tank does not need to be cooled as fast even if the temperature in the fuel tank is high. In this regard, in the configuration described above, the amount increasing control of increasing the amount of return fuel is carried out when the vehicle is stopped. When the vehicle is not stopped, the amount increasing control of increasing the amount of return fuel is prohibited. Thus, if there is a possibility of the fuel being refilled and the temperature in the fuel tank needs to be rapidly lowered, the amount of low temperature fuel to be returned to the fuel tank can be increased to rapidly lower the temperature in the fuel tank. Furthermore, when the fuel is not refilled, the amount of return fuel is not increased and thus the amount of return fuel is suppressed from being unnecessarily increased.

To achieve the above object, according to a second aspect of the present invention, there is provided a vehicle fuel cooling device including a return passage that returns a non-injected surplus fuel of a fuel supplied to a fuel injection valve to a fuel tank as a return fuel; a fuel cooling unit arranged on the return passage; a branched passage branched from a circulating path of a cooling medium of a vehicle air conditioning system, a part of the cooling medium being supplied to the fuel cooling unit through the branched passage; and an electromagnetic valve that is arranged on the branched passage and that adjusts the amount of cooling medium to be supplied to the fuel cooling unit, an amount of cooling medium to be supplied to the fuel cooling unit being increased when an opening of the electromagnetic valve increases. In the vehicle fuel cooling device, the amount of return fuel to be returned to the fuel tank is increased when the opening of the electromagnetic valve is greater than or equal to a predetermined opening compared to when the opening of the electromagnetic valve is smaller than the predetermined opening.

In the configuration described above, when the opening of the electromagnetic valve is greater than or equal to the predetermined opening and the amount of cooling medium to be supplied to the fuel cooling unit is large, the amount of return fuel to be returned to the fuel tank is increased. In this case, the low temperature return fuel is returned to the fuel tank in large amounts, so that the temperature in the fuel tank can be rapidly lowered. Moreover, when the opening of the electromagnetic valve is smaller than the predetermined opening and the amount of cooling medium supplied to the fuel cooling unit is small, the amount of return fuel to be returned to the fuel tank becomes small. Thus, the high temperature return fuel that is not sufficiently cooled can be suppressed from being returned to the fuel tank in large amounts, and the temperature rise in the fuel tank can be suppressed. Therefore, the temperature rise in the fuel tank can be suppressed and the temperature in the fuel tank can be rapidly lowered.

BRIEF DESCRIPTION OF THE DRAWINGS

FIG. 2 is a flowchart showing a fuel cooling control.

FIG. 3 is a graph showing a relationship of a fuel injection amount and a drive amount of a fuel pump.

FIG. 4(a) is a timing chart showing a temperature change in the fuel tank by a fuel cooling control.

FIG. 4(b) is a timing chart showing a control mode of an electromagnetic valve by the fuel cooling control.

FIG. 4(c) is a timing chart showing a transition in the amount of return fuel by the fuel cooling control.

FIG. 5 is a flowchart showing a fuel cooling control according to a second embodiment of the present invention.

FIG. 6 is a flowchart showing a fuel cooling control according to a third embodiment of the present invention.

MODE FOR CARRYING OUT THE INVENTION

First Embodiment

A first embodiment embodying a vehicle fuel cooling device of the present invention will be hereinafter described with reference to FIGS. 1 to 4(c).

Figure 1:
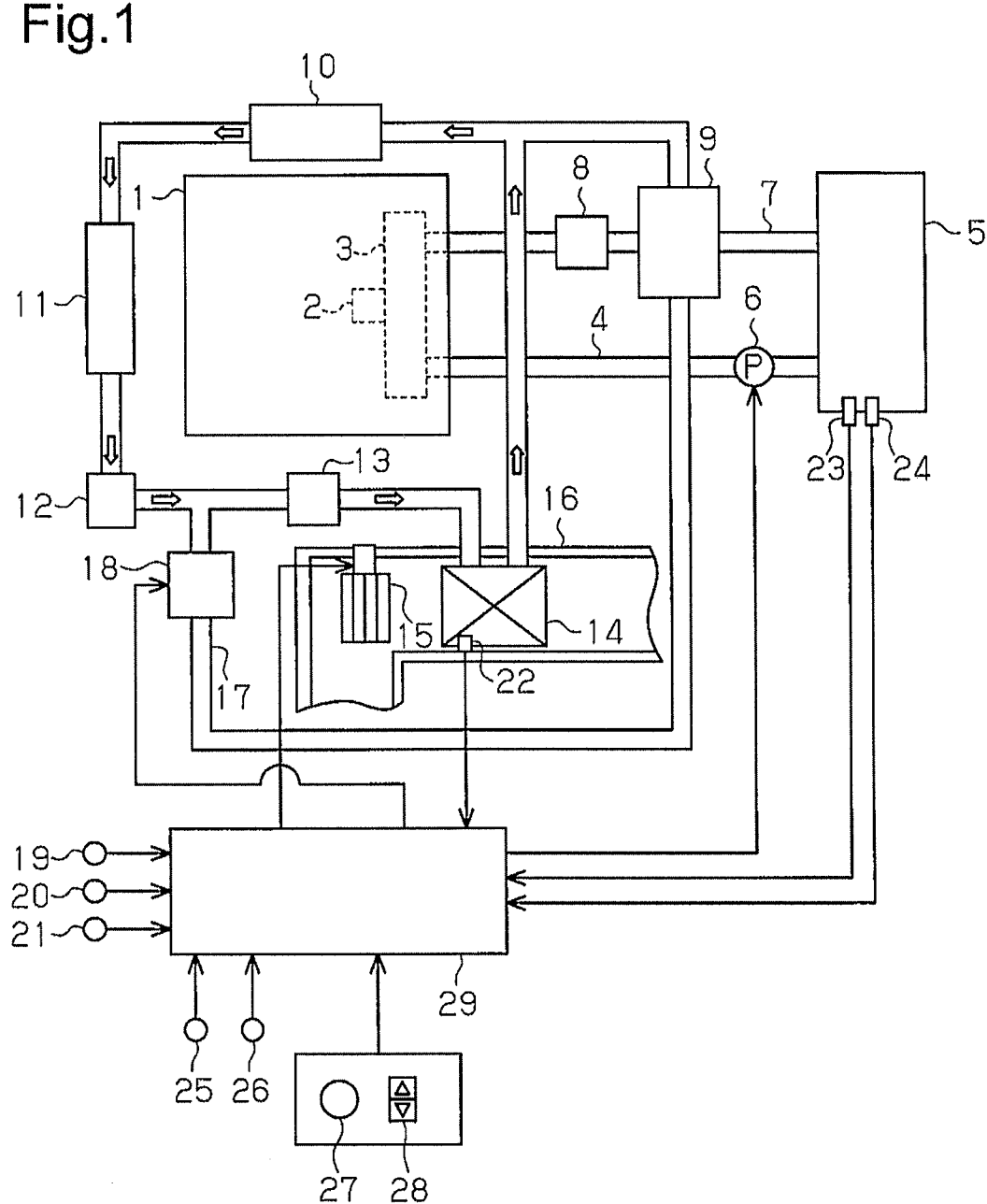
FIG. 1 is a block diagram showing an overall configuration of a vehicle fuel cooling device according to a first embodiment of the present invention.

As shown in FIG. 1, an internal combustion engine 1 serving as a drive source is mounted on a vehicle. A fuel injection valve 2 that injects fuel is arranged in the internal combustion engine 1. The fuel injection valve 2 is connected to a delivery pipe 3. The delivery pipe 3 is connected to a fuel tank 5 through a fuel supplying passage 4. A fuel pump 6 is arranged on the fuel supplying passage 4. The fuel pump 6 supplies the fuel accumulated in the fuel tank 5 to the fuel injection valve 2. The vehicle uses LPG for the fuel.

The surplus fuel that is not injected from the fuel injection valve 2 is returned to the fuel tank 5 through a return passage 7. A pressure regulator 8 is arranged on the return passage 7. The pressure regulator 8 maintains the pressure of the fuel supplied to the fuel injection valve 2 at a predetermined pressure. A fuel cooling unit 9 is arranged on the return passage 7.

A vehicle air conditioning system that adjusts the air in the vehicle compartment is mounted on the vehicle. The air conditioning system includes an electrically driving type compressor 10 that compresses a cooling medium, a capacitor 11, and a receiver 12. The capacitor 11 cools the cooling medium that has been compressed by the compressor 10 and became a high temperature. The receiver 12 carries out a vapor-liquid separation of the cooling medium that passed the capacitor 11. The air conditioning system also includes an expansion valve 13, an evaporator 14, and a blower 15. The expansion valve 13 atomizes the cooling medium that passed the receiver 12. The evaporator 14 cools the air to be introduced into the vehicle compartment using the vaporization heat of the atomized cooling medium. The blower 15 adjusts the amount of air to supply to the evaporator 14. The evaporator 14 and the blower 15 are arranged on an intake duct 16, to which air is introduced from the interior of the vehicle compartment and the exterior of the vehicle compartment. When the compressor 10 is driven, the cooling medium is circulated as shown with an arrow in FIG. 1 in the air conditioning system.

The air conditioning system also includes a branched passage 17 branched from a circulating passage of the cooling medium flowing between the receiver 12 and the expansion valve 13. The branched passage 17 is connected to the circulating passage of the cooling medium flowing between the evaporator 14 and the compressor 10. The branched passage 17 circulates a part of the cooling medium of the air conditioning system while circumventing the evaporator 14. The fuel cooling unit 9 is connected to the middle of the branched passage 17. The cooling medium is supplied to the fuel cooling unit 9 through the branched passage 17. The cooling medium supplied to the fuel cooling unit 9 cools the fuel flowing through the return passage 7 through heat exchange. An electromagnetic valve 18 is arranged on the branched passage 17. The electromagnetic valve 18 adjusts the amount of cooling medium flowing through the branched passage 17, that is, the amount of cooling medium supplied from the circulating passage of the cooling medium to the fuel cooling unit 9.

Various types of sensors are mounted in the vehicle. The sensors include an in-vehicle compartment temperature sensor 19 that detects the temperature (inside air temperature) in the vehicle compartment, an outside air temperature sensor 20 that detects the outside air temperature, a solar radiation amount sensor 21 that detects a solar radiation amount, an evaporator temperature sensor 22 that detects the temperature of the evaporator 14, a pressure sensor 23 that detects the pressure in the fuel tank 5, a fuel temperature sensor 24 that detects the temperature in the fuel tank 5, a crank angle sensor 25 that detects an engine rotation speed, an air flow sensor 26 that detects an intake air amount and the like. An air conditioner switch 27 for a passenger to drive the air conditioning system, a temperature setting switch 28 for the passenger to set the temperature in the vehicle compartment and the like are also arranged in the vehicle compartment.

The vehicle fuel cooling device includes an electronic control unit 29, to which an output signal from each sensor described above is input. The electronic control unit 29 executes an air conditioning control and a fuel cooling control based on the output signal from each sensor. In the air conditioning control, a target blow-out temperature (hereinafter referred to as TAO), which is a target value of the temperature of the air blown out into the vehicle compartment, is calculated based on the inside air temperature, the outside air temperature, the solar radiation amount, the evaporator temperature, and the like. Furthermore, the drive amount of the compressor 10, the blower 15, and the like are controlled in accordance with the calculated target blow-out temperature. In the fuel cooling control, the electromagnetic valve 18 is controlled in accordance with the temperature in the fuel tank 5. The cooling mode of the return fuel to be returned to the fuel tank 5 is thereby controlled.

Next, the fuel cooling control will be described with reference to FIGS. 2 and 3. The fuel cooling control is repeatedly executed for every predetermined period by the electronic control unit 29.

As shown in FIG. 2, the electronic control unit 29 first determines whether or not the compressor 10 is in the drive state (step S21). In such process, the positive determination is made when the air conditioner switch 27 is in the ON state. When the compressor 10 is in the drive state (step S21:

YES), the electronic control unit 29 determines whether or not the electromagnetic valve 18 is in a fully opened state (step S22). The electromagnetic valve 18 is controlled to be in the fully opened state when the compressor 10 is in the drive state and the temperature in the fuel tank 5 is higher than or equal to a predetermined temperature T1. On the other hand, the electronic valve 18 is controlled to be in a fully closed state when the temperature in the fuel tank 5 is lower than or equal to a predetermined temperature T0 lower than the predetermined temperature T1. The predetermined temperature T1 is a minimum value of the temperature at which the pressure in the fuel tank 5 may become high and the refilling of fuel to the fuel tank 5 may become difficult. When the electromagnetic valve 18 is in the fully opened state (step S22: YES), the electronic control unit 29 controls the fuel pump 6 based on a map A stored in the electronic control unit 29 (step S23) and terminates a series of processes. The map A is an arithmetic map showing the relationship of the fuel injection amount and the drive amount of the fuel pump 6.

When the compressor 10 is not in the drive state (step S21: NO) or when the electromagnetic valve 18 is in the fully closed state (step S22: NO), on the other hand, the electronic control unit 29 controls the fuel pump 6 based on a map B stored in the electronic control unit 29 (step S24) and terminates a series of processes. Similar to the map A, the map B is an arithmetic map showing the relationship of the fuel injection amount and the drive amount of the fuel pump 6.

The difference between the map A and the map B, and the control mode of the fuel pump 6 using such maps will now be described with reference to FIG. 3.

FIG. 3 shows the relationship of the fuel injection amount injected from the fuel injection valve 2 and the minimum drive amount Wi of the fuel pump 6 necessary for supplying the fuel of an amount equal to the injection amount to the fuel injection valve 2 with a broken line. The minimum drive amount Wi corresponding to the fuel injection amount can be obtained in advance through experiments and the like. The fuel injection amount injected from the fuel injection valve 2 can be calculated based on an engine load calculated based on the intake air amount and the engine rotation speed.

As shown with a solid line FIG. 3, the map A stores a value in which a predetermined drive amount Wa is added to the minimum drive amount Wi as a map value. As shown with a chain dashed line in FIG. 3, the map B stores a value in which a predetermined drive amount Wb is added to the minimum drive amount Wi as a map value. The drive amount Wa is greater than the drive amount Wb. The drive amount Wb is set to a value of an extent the pressure of the fuel to be supplied to the fuel injection valve 2 does not become smaller than a valve-open pressure of the pressure regulator 8.

Therefore, when the fuel pump 6 is controlled based on the map A by the process of step S23 of FIG. 2, the fuel pump 6 is controlled with the drive amount (Wi+Wa) in which the predetermined drive amount Wa is added to the minimum drive amount Wi. Thus, the fuel of an amount corresponding to the predetermined drive amount Wa becomes a surplus in the fuel injection valve 2. The fuel of an amount substantially equal to the fuel of an amount corresponding to the predetermined drive amount Wa is thus returned to the fuel tank 5 as the return fuel. When the fuel pump 6 is controlled based on the map B by the process of step S24 of FIG. 2, the fuel pump 6 is controlled with the drive amount (Wi+Wb) in which the predetermined drive amount Wb is added to the minimum drive amount Wi. Thus, the fuel of an amount corresponding to the predetermined drive amount Wb becomes a surplus in the fuel injection valve 2. The fuel of an amount substantially equal to the fuel of an amount corresponding to the predetermined drive amount Wb is thus returned to the fuel tank 5 as the return fuel.

The operation of the first embodiment will now be described with reference to FIG. 1 and FIGS. 4(a) to 4(c).

As shown in FIG. 1, the temperature of the fuel supplied to the fuel injection valve 2 becomes high by the heat of the internal combustion engine 1. Thus, when the high temperature fuel is returned to the fuel tank 5, the temperature in the fuel tank 5 gradually rises, as shown in FIG. 4(a). Then, as shown in FIG. 4(b), the electromagnetic valve 18 is controlled to be in the fully opened state at a timing t41 at which the compressor 10 is in the drive state and the temperature in the fuel tank 5 is higher than or equal to the predetermined temperature T1. As a result, the cooling medium is supplied to the fuel cooling unit 9. In this case, as shown with a chain dashed line in FIG. 4(c), when the drive amount of the fuel pump 6 is controlled based on the map B regardless of the presence or absence of the fuel cooling, the amount of return fuel is maintained constant even after the timing t41. Thus, as shown with a chain dashed line in FIG. 4(a), the temperature in the fuel tank 5 gradually lowers. The electromagnetic valve 18 is controlled to be in the fully closed state at a timing t43 at which the temperature in the fuel tank 5 becomes lower than or equal to the predetermined temperature T0. As a result, the fuel cooling is stopped.

When the electromagnetic valve 18 is controlled to be in the fully opened state at the timing t41, the fuel pump 6 is controlled based on the map A. As a result, as shown in FIG. 4(c), the amount of return fuel to be returned to the fuel tank 5 increases. Thus, the low temperature return fuel is returned to the fuel tank 5 in large amounts in a state that the electromagnetic valve 18 is in the fully opened state and the cooling medium is circulating in the fuel cooling unit 9. As a result, as shown with a solid line in FIG. 4(a), the temperature in the fuel tank 5 rapidly lowers, and the temperature in the fuel tank 5 becomes lower than or equal to the predetermined temperature T0 at a timing t42 earlier than the timing t43.

When the electromagnetic valve 18 is controlled to be in the fully closed state or when the compressor 10 is not in the drive state, that is, when the cooling medium is not circulating in the fuel cooling unit 9, the fuel pump 6 is controlled based on the map B, and thus the amount of return fuel is reduced. In this case, the temperature rise in the fuel tank 5 is suppressed since the high temperature return fuel is suppressed from being returned to the fuel tank 5 in large amounts.

Therefore, the first embodiment has the following effect.

(1) When the electromagnetic valve 18 is in the fully opened state and a part of the cooling medium is circulated to the fuel cooling unit 9 to cool the return fuel, control is performed to increase the amount of return fuel to be returned to the fuel tank 5 compared to when the return fuel is not cooled. Accordingly, the temperature rise in the fuel tank 5 is suppressed and the temperature in the fuel tank 5 is rapidly lowered.

Second Embodiment

Next, a second embodiment embodying the vehicle fuel cooling device of the present invention will now be described with reference to FIG. 5. In the second embodiment, the vehicle fuel cooling device is mounted on a vehicle that carries out an idling stop control of automatically stopping the internal combustion engine when a predetermined stop condition is met and automatically starting the internal combustion engine when a predetermined start condition is met. The second embodiment differs from the first embodiment in the series of processes related to the fuel cooling control. Thus, in the second embodiment, the same reference numerals are denoted on the configurations similar to the first embodiment, and a detailed description thereof will be omitted.

As shown in FIG. 5, the electronic control unit 29 first determines whether or not the compressor 10 is in the drive state (step S51). When the compressor 10 is in the drive state (step S51: YES), the electronic control unit 29 determines whether or not the electromagnetic valve 18 is in the fully opened state (step S52). When the electromagnetic valve 18 is in the fully opened state (step S52: YES), the electronic control unit 29 controls the fuel pump 6 based on the map A stored in the electronic control unit 29 (step S53) and terminates the series of processes.

When the electromagnetic valve 18 is in the fully closed state (step S52: NO), the electronic control unit 29 determines whether or not the internal combustion engine 1 is in an automatic stop state (step S54). When the internal combustion engine 1 is in the automatic stop state (step S54: YES), the electronic control unit 29 stops the fuel pump 6 (step S55) and terminates the series of processes. When the internal combustion engine 1 is not in the automatic stop state (step S54: NO), the electronic control unit 29 controls the fuel pump 6 based on the map B stored in the electronic control unit 29 (step S6) and terminates the series of processes. Even when the compressor 10 is not in the drive state (step S51: NO), the electronic control unit 29 proceeds to the process of step S56, controls the fuel pump 6 based on the map B and terminates the series of processes.

The operation of the second embodiment will now be described with reference to FIGS. 1 to 5.

As shown in FIG. 1, when the internal combustion engine 1 is in the automatic stop state, the fuel substantially does not need to be injected from the fuel injection valve 2, and thus substantially the entire amount of fuel pumped up from the fuel pump 6 is returned to the fuel tank 5 as the return fuel. In this case, the high temperature return fuel is returned to the fuel tank 5 in large amounts when the return fuel is not cooled, and thus the temperature in the fuel tank 5 rises.

As shown in FIG. 5, in the second embodiment, the drive of the fuel pump 6 is controlled to stop when the internal combustion engine 1 is in the automatic stop state and the electromagnetic valve 18 is in the fully closed state. Thus, when the return fuel is not cooled, the amount of high temperature fuel to be returned to the fuel tank 5 is reduced as much as possible. In this case, the unnecessary drive of the fuel pump 6 is suppressed.

Therefore, the second embodiment has the following effect in addition to the effect of (1).

(2) The drive of the fuel pump 6 is controlled to stop when the internal combustion engine 1 is in the automatic stop state and the return fuel is not cooled. In this case, the unnecessary drive of the fuel pump 6 is suppressed, and thus the fuel efficiency is enhanced and the temperature rise in the fuel tank 5 is also suppressed.

Third Embodiment

A third embodiment embodying the vehicle fuel cooling device of the present invention will now be described with reference to FIGS. 6 and 7. The third embodiment differs from the first embodiment in the series of processes related to the fuel cooling control. Thus, in the third embodiment, the same reference numerals are denoted on the configurations similar to the first embodiment, and a detailed description thereof will be omitted.

As shown in FIG. 6, the electronic control unit 29 first determines whether or not the compressor 10 is in the drive state (step S61). When the compressor 10 is in the drive state (step S61: YES), the electronic control unit 29 determines whether or not the electromagnetic valve 18 is in the fully opened state (step S62). When the electromagnetic valve 18 is in the fully opened state (step S62: YES), the electronic control unit 29 determines whether or not the vehicle is in the stop state (step S63). Whether or not the vehicle is in the vehicle state is, for example, determined based on whether or not the shift range is in the parking position. When the shift range is in the parking position and the vehicle is in the stop state (step S63: YES), the electronic control unit 29 controls the fuel pump 6 based on the map A stored in the electronic control unit 29 (step S64) and terminates the series of processes.

When the shift range is in a drive position other than the parking position, and the vehicle is not in the stop state (step S63: NO), the electronic control unit 29 proceeds to the process of step S65. The electronic control unit 29 controls the fuel pump 6 based on the map B stored in the electronic control unit 29 and terminates the series of processes. When the compressor 10 is not in the drive state (step S61: NO) or when the electromagnetic valve 18 is in the fully closed state (step S62: NO) as well, the electronic control unit 29 executes the process of step S65 and terminates the series of processes.

The operation of the third embodiment will now be described with reference to FIGS. 7(a) to 7(d).

Figure 7A:
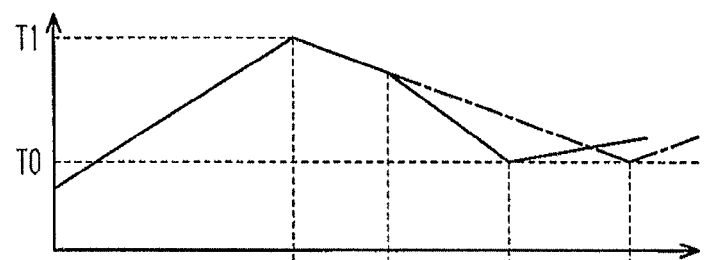
FIG. 7(a) is a timing chart showing a temperature change in the fuel tank by a fuel cooling control.
Figure 7B:
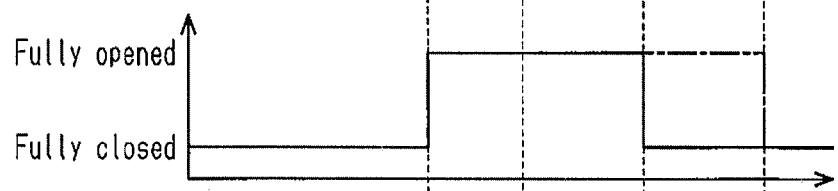
FIG. 7(b) is a timing chart showing a control mode of an electromagnetic valve by the fuel cooling control.
Figure 7C:
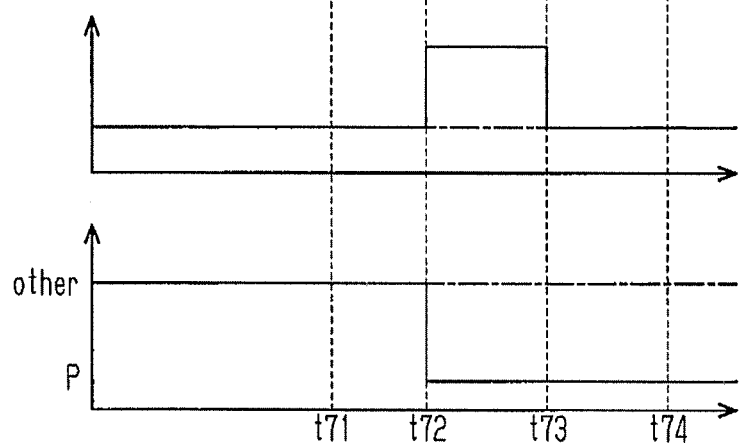
FIG. 7(c) is a timing chart showing change in the amount of return fuel by the fuel cooling control.

As shown in FIG. 7(a), at a timing t71 at which the compressor 10 is in the drive state and the temperature in the fuel tank 5 is higher than or equal to the predetermined temperature T1, the electromagnetic valve 18 is controlled to be in the fully opened state, as shown in FIG. 7(b). As shown with a chain dashed line in FIG. 7(d), when the shift range is in a position other than the parking position, the vehicle is travelling and the fuel is not refilled. Thus, even if the temperature in the fuel tank 5 is high, the fuel tank 5 does not need to be rapidly cooled. Thus, the fuel pump 6 is controlled based on the map B and is controlled so as not to increase the amount of return fuel, as shown with a chain dashed line in FIG. 7(c). As a result, the temperature in the fuel tank 5 gradually lowers, as shown with a chain dashed line in FIG. 7(a). The electromagnetic valve 18 is controlled to be in the fully closed state and the fuel cooling is stopped at a timing t74 at which the temperature in the fuel tank 5 becomes lower than or equal to the predetermined temperature T0.

Figure 7D:
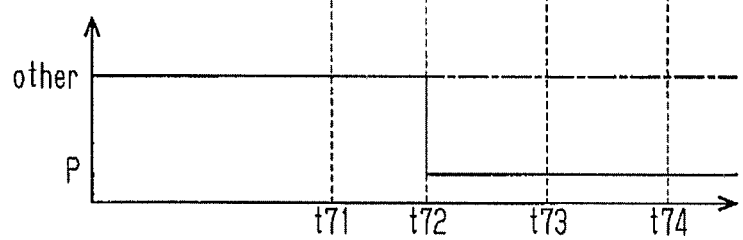
FIG. 7D is a timing chart showing a transition in the control of a shift range by the fuel cooling control.

On the other hand, as shown with a solid line in FIG. 7(d), when the shift range is switched to the parking position and the vehicle is in the stop state at timing t72, the fuel has a possibility of being refilled to the fuel tank 5. Thus, the fuel pump 6 is controlled based on the map A and is controlled to increase the amount of return fuel to be returned to the fuel tank 5, as shown with a solid line in FIG. 7(c). The low temperature return fuel is thereby returned to the fuel tank 5 in large amounts, and hence the temperature in the fuel tank 5 rapidly lowers, as shown with a solid line in FIG. 7(a). As a result, the temperature in the fuel tank 5 becomes lower than or equal to the predetermined temperature T0 at a timing t73 earlier than the timing t74.

Thus, when the vehicle is in the stop state and the fuel has a possibility of being refilled, an amount increasing control of increasing the amount of low temperature fuel to be returned to the fuel tank 5 is executed. As a result, the temperature in the fuel tank 5 rapidly lowers. When the vehicle is travelling and the fuel is not refilled, the amount increasing control of increasing the amount of return fuel is not executed. Thus, the amount of return fuel is suppressed from being unnecessarily increased.

Therefore, the third embodiment has the following effect in addition to the effect of (1).

(3) When the vehicle is stopped and the electromagnetic valve 18 is in the fully opened state and thus the return fuel is cooled, control is performed to increase the amount of return fuel compared to when the electromagnetic valve 18 is in the fully closed state and the return fuel is not cooled. In this case, determination is made that the temperature in the fuel tank 5 needs to be rapidly lowered, and hence the amount of low temperature fuel to be returned to the fuel tank 5 is increased and the temperature in the fuel tank 5 is rapidly lowered. When the vehicle is not stopped, a determination is made that the temperature in the fuel tank 5 does not need to be rapidly lowered, and the amount-increasing control for increasing the amount of return fuel is prohibited. The amount of return fuel is thereby suppressed from being unnecessarily increased.

Each embodiment described above may be modified as below.

In the second embodiment, the vehicle fuel cooling device is applied to the vehicle that executes the idling stop control, but may be applied to other types of vehicles that automatically stops the internal combustion engine 1, for example, a hybrid vehicle including the internal combustion engine 1 and a motor. In this case, the process of step S55 is executed when the internal combustion engine 1 is stopped and the vehicle is travelling only with the power of the motor and when the electromagnetic valve 18 is in the fully closed state. Effects similar to (1) and (2) can be obtained with such configuration as well.

In the third embodiment, determination is made that the vehicle is in the stop state when the shift range is in the parking position, but for example, determination may be made that the vehicle is in the stop state when the shift range is in the neutral position. Furthermore, determination may be made that the vehicle is in the stop state when the vehicle speed is zero. Moreover, determination may be made that the vehicle is in the stop state when one or a plurality of conditions of such conditions is satisfied. Effects similar to (1) and (3) can be obtained with such configuration as well.

In the first and third embodiments, the drive amount of the fuel pump 6 is increased to increase the amount of return fuel to be returned to the fuel tank 5, but the opening of the electromagnetic valve arranged on the return passage 7 may be increased to increase the amount of return fuel.

Figure 8:
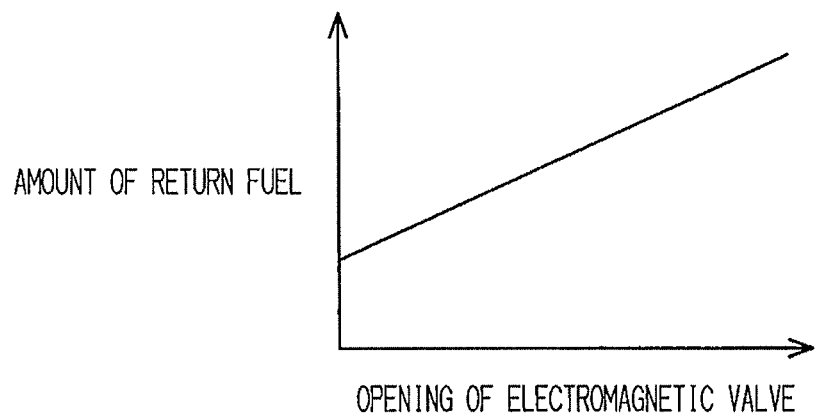
FIG. 8 is a graph showing a relationship of the opening of the electromagnetic valve and the amount of return fuel according to a modified embodiment.

In each embodiment described above, the electromagnetic valve 18 is controlled to be in the fully opened state or the fully closed state, but the opening of the electromagnetic valve 18 may be changed according to the temperature of the fuel tank 5. For example, as shown in FIG. 8, the amount of return fuel is desirably increased when the opening of the electromagnetic valve 18 increases. In this case, the amount of cooling medium flowing through the branched passage 17 becomes greater when the opening of the electromagnetic valve 18 increases, and the cooling efficiency of the return fuel increases. If the amount of return fuel is further increased in this case, the low temperature return fuel is returned to the fuel tank 5 in a larger amount, and thus the temperature in the fuel tank 5 can be more rapidly lowered.

In each embodiment described above, an example of controlling the fuel pump 6 using the map A storing the value in which the predetermined drive amount Wa is added to the minimum drive amount Wi, and the map B storing the value in which the predetermined drive amount Wb is added to the minimum drive amount Wi is shown. On the contrary, if the amount of return fuel is increased when the fuel pump 6 is being controlled based on the map A compared to when the fuel pump 6 is being controlled based on the map B, such map values may be appropriately changed. For example, the control may be made to increase the return fuel when the fuel injection amount increases, and the control may be made to increase the return fuel when the fuel injection amount decreases.

In each embodiment described above, the fuel pump 6 is controlled based on the maps stored in the electronic control unit 29, but the drive amount of the fuel pump 6 corresponding to the fuel injection amount may be computed each time.

Figure 9:
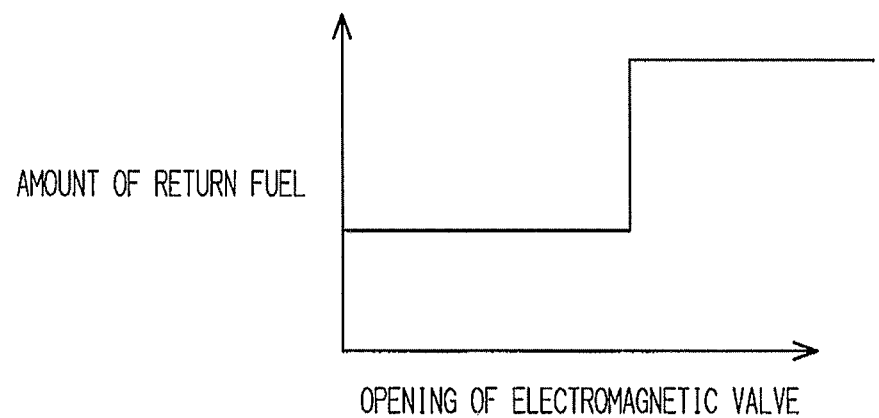
FIG. 9 is a graph showing a relationship of the opening of the electromagnetic valve and the amount of return fuel according to a modified embodiment.

The control mode of the amount of return fuel in the first embodiment may be modified as shown in FIG. 9. In other words, when the opening of the electromagnetic valve 18 is greater than or equal to the predetermined opening, the amount of return fuel to be returned to the fuel tank 5 may be increased, compared to when the opening of the electromagnetic valve 18 is smaller than the predetermined opening. In this case, when the opening of the electromagnetic valve 18 is greater than or equal to the predetermined opening and the amount of cooling medium to be supplied to the fuel cooling unit 9 is large, the amount of return fuel to be returned to the fuel tank 5 becomes large. Thus, the low temperature return fuel is returned to the fuel tank 5 in large amounts, and hence the temperature in the fuel tank 5 can be rapidly lowered. Furthermore, when the opening of the electromagnetic valve 18 is smaller than the predetermined opening and the amount of cooling medium supplied to the fuel cooling unit 9 is small, the amount of return fuel to be returned to the fuel tank 5 becomes small. Thus, the high temperature return fuel is suppressed from being returned to the fuel tank 5 in large amounts, and the temperature rise in the fuel tank 5 is suppressed. Therefore, the temperature rise in the fuel tank 5 is suppressed and the temperature in the fuel tank 5 can be rapidly lowered.

In each embodiment described above, the electromagnetic valve 18 is controlled according to the temperature in the fuel tank 5, but the electromagnetic valve 18 may be controlled according to the pressure in the fuel tank 5. Furthermore, the electromagnetic valve 18 may be controlled according to the temperature and the pressure in the fuel tank 5.

In each embodiment described above, the electrically driving type compressor 10 is used, but a variable capacitance type engine driving type compressor may be used.

In each embodiment described above, the position of the electromagnetic valve 18 may be changed to a connecting portion of the branched passage 17 and the circulating path of the cooling medium. In this case, a three-way valve may be adopted for the electromagnetic valve, and the electromagnetic valve may be controlled so that the whole amount of cooling medium flows to the branched passage 17.

In each embodiment described above, other fuels such as compressed natural gas (CNG), shale gas, and the like may be used.

The invention claimed is:

1. A vehicle fuel cooling device including a return passage that returns a non-injected surplus fuel of a fuel supplied to a fuel injection valve to a fuel tank as a return fuel and a fuel cooling unit arranged on the return passage, wherein the vehicle fuel cooling device cools the return fuel through heat exchange with a cooling medium flowing through the fuel cooling unit by circulating a part of the cooling medium to the fuel cooling unit; wherein
   when circulating a part of the cooling medium to the fuel cooling unit to cool the return fuel, an amount of return fuel to be returned to the fuel tank is increased compared to when the return fuel is not cooled.

2. The vehicle fuel cooling device according to claim 1, wherein
   a vehicle air conditioning system includes a circulating path that circulates the cooling medium and a branched passage branched from the circulating path;
   the cooling medium is supplied to the fuel cooling unit through the branched passage such that the part of the cooling medium circulates to the fuel cooling unit;
   an electromagnetic valve is arranged on the branched passage;
   when the electromagnetic valve is in a fully closed state, the supply of the cooling medium from the circulating path to the fuel cooling unit is shielded and the cooling of the return fuel is stopped; and
   when the electromagnetic valve is in a valve open state, the cooling medium is supplied from the circulating path to the fuel cooling unit to cool the return fuel, and the amount of return fuel to be returned to the fuel tank is increased in comparison to when the electromagnetic valve is in the fully closed state.

3. The vehicle fuel cooling device according to claim 2, wherein
   the electromagnetic valve is controlled to be in the fully opened state or the fully closed state; and
   the amount of return fuel to be returned to the fuel tank is increased when the electromagnetic valve is in the fully opened state compared to when the electromagnetic valve is in the fully closed state.

4. The vehicle fuel cooling device according to claim 2, wherein
   the amount of return fuel to be returned to the fuel tank is increased when an opening of the electromagnetic valve increases.

5. The vehicle fuel cooling device according to claim 1, further comprising:
   a fuel pump that supplies the fuel in the fuel tank to the fuel injection valve; wherein
   the amount of return fuel to be returned to the fuel tank is increased by increasing a drive amount of the fuel pump.

6. The vehicle fuel cooling device according to claim 5, wherein
   the vehicle fuel cooling device is mounted on a vehicle that automatically stops an internal combustion engine; and
   when the internal combustion engine is in an automatic stop state and the return fuel is not cooled, the fuel pump is stopped.

7. The vehicle fuel cooling device according to claim 1, wherein
   when the vehicle is stopped, an amount increasing control of increasing the amount of return fuel to be returned to the fuel tank when the return fuel is cooled compared to when the return fuel is not cooled is executed; and
   when the vehicle is not stopped, the amount increasing control is prohibited.

8. A vehicle fuel cooling device comprising:
   a return passage that returns a non-injected surplus fuel of a fuel supplied to a fuel injection valve to a fuel tank as a return fuel;
   a fuel cooling unit arranged on the return passage;
   a branched passage branched from a circulating path of a cooling medium, a part of the cooling medium being supplied to the fuel cooling unit through the branched passage such that the part of the cooling medium circulates to the fuel cooling unit; and
   an electromagnetic valve that is arranged on the branched passage and that adjusts the amount of cooling medium to be supplied to the fuel cooling unit, an amount of cooling medium to be supplied to the fuel cooling unit being increased when an opening of the electromagnetic valve is increased; wherein
   the amount of return fuel to be returned to the fuel tank is increased when the opening of the electromagnetic valve is greater than or equal to a predetermined opening, compared to when the opening of the electromagnetic valve is smaller than the predetermined opening.

* * * * *